United States Patent

Kovacs

Patent Number: 5,918,552
Date of Patent: Jul. 6, 1999

[54] ROTARY CAM OPERATED POSITIONING APPARATUS

[76] Inventor: Michael Kovacs, 51740 Sass Rd., Chesterfield Township, Mich. 48047

[21] Appl. No.: 08/972,086

[22] Filed: Nov. 17, 1997

Related U.S. Application Data

[60] Provisional application No. 60/040,409, Mar. 11, 1997.

[51] Int. Cl.$^6$ ..................................................... A47B 11/00
[52] U.S. Cl. ........................................... 108/138; 108/141
[58] Field of Search ..................................... 108/138, 141, 108/147, 20, 21, 22, 143; 74/89.15, 56

[56] References Cited

U.S. PATENT DOCUMENTS

| | | | |
|---|---|---|---|
| 2,673,773 | 3/1954 | Dusenbury | 108/138 |
| 4,725,703 | 2/1988 | Park | 108/141 X |
| 5,323,712 | 6/1994 | Kikuiri | 108/138 X |
| 5,524,502 | 6/1996 | Osanai | 108/141 X |

OTHER PUBLICATIONS

Applicant's Application 60/040,268 Filed Mar. 11, 1997, Device Described Therein on Market Publically Since at Least Before Mar. 11, 1996.

Primary Examiner—Jose V. Chen
Attorney, Agent, or Firm—Peter D. Keefe

[57] ABSTRACT

A positioning apparatus featuring a rotary cam mechanism for providing movement of a platform along a vertical axis and an adjustment mechanism for providing movement of a mounting surface of the platform along a horizontal axis located in a horizontal plane oriented perpendicular to the vertical axis. A bifurcated platform, having upper and lower platforms, is mounted in vertically movable relation to a base, and a rotary cam mechanism is interfaced between the base and the platform for providing selective vertical movement of the platform in relation to the base responsive to selective rotation of a rotary cam. The rotary cam is rotatably connected to the base and includes a pair of opposing inclined cam slots formed therein. A pair of cam pins are connected to the lower platform in mutually opposing relation so as to be each respectively located in a respective cam slot. A threaded vertical adjustment bolt is rotatably connected to the base, in axially immovable relation with respect thereto. The vertical adjustment bolt threadably engages a threaded vertical adjustment nut which is pivotally connected to the rotary cam. A horizontal adjustment mechanism selectively adjusts the horizontal position of an upper platform relative to the lower platform.

17 Claims, 3 Drawing Sheets

ROTARY CAM OPERATED POSITIONING APPARATUS

CROSS-REFERENCE TO RELATED APPLICATIONS

The present application is a continuation-in-part application of Ser. No. 60/040,409, filed on Mar. 11, 1997, which is presently pending.

BACKGROUND OF THE INVENTION

1. Field of the Invention

The present invention is related to apparatus for providing selective positioning of a mounting surface of a platform. More particularly, the present invention is related to a positioning apparatus for selectively elevating a mounting platform via rotation of a rotary cam mechanism.

2. Description of the Prior Art

Electric motors are commonly connected to driven devices by V-belts. The V-belt resides in a groove of a drive wheel connected to a shaft of the motor, and further resides in a groove of a driven wheel connected to a shaft of the driven device. In order to tighten the V-belt with respect to a close frictional fit with the grooves of the drive and driven wheels, the drive wheel must be selectively positioned with respect to the driven wheel. In practice, this is accomplished by repositioning the motor, in that generally the driven device is mounted stationary at a fixed location.

On way to accomplish selective repositioning of the motor is to mount the motor to a positionally adjustable mounting platform. For example, it is known to pivotally reposition a mounting platform by a hinge and bolt arrangement, wherein rotation of a bolt rotatably connected to one side of the mounting platform causes the mounting platform to pivot on a pin located at the other side of the mounting platform. This arrangement works adequately for many motor positioning situations. However, since it relies upon pivoting of the mounting platform, it is not usable to adjust multiple V-belts simultaneously where the various driven wheels are non-aligned, that is, disposed at varying angles about the drive shaft of the motor.

Accordingly, what is needed is a positioning apparatus which allows for simultaneous adjustment of V-belt tensioning where a plurality of mutually non-aligned V-belts are interfaced with a drive wheel of a motor.

SUMMARY OF THE INVENTION

The present invention is a positioning apparatus featuring a rotary cam mechanism for providing movement of a platform along a vertical axis and an adjustment mechanism for providing movement of a mounting surface of the platform along a horizontal axis located in a horizontal plane oriented perpendicular to the vertical axis. The positioning apparatus provides, for example, for simultaneous adjustment of V-belt tensioning where a plurality of mutually non-aligned V-belts are interfaced with a drive shaft of a motor.

The positioning apparatus according to the present invention includes a base, a platform mounted in vertically movable relation to the base, and a rotary cam mechanism interfaced between the base and the platform for providing selective vertical movement of the platform in relation to the base responsive to selective rotation of a rotary cam of the rotary cam mechanism.

The base is structured for being fixedly connected to a secondary structural member, such as for example an immovable pedestal The base has an interior hollow space whereat the rotary cam mechanism resides. The platform is guidably interfaced with the base via a plurality of mutually spaced, cooperating vertical guide pins and vertical guide holes. The rotary cam is rotatably connected to the base and includes a pair of opposing inclined cam slots formed therein. A pair of cam pins are connected to the platform in mutually opposing relation so as to be each respectively located in a respective cam slot. A threaded vertical adjustment bolt is rotatably connected to the base, in axially immovable relation with respect thereto. The vertical adjustment bolt threadably engages a threaded vertical adjustment nut which is pivotally connected to the rotary cam.

In operation, rotation of the vertical adjustment bolt causes the vertical adjustment nut to axially move along the threads of the vertical adjustment bolt. Consequently, the rotary cam is caused to rotate in relation to the base, thereby causing the cam pins to slide along the inclined cam slots. The movement of the cam pins along the cam slots causes the platform to move vertically in relation to the base, wherein the vertical guide holes of the lower platform slide guidably on respective vertical guide pins of the base.

Further, the positioning apparatus is preferred to include a horizontal adjustment mechanism to selectively adjust the position of at least a portion of the platform with respect to the base in a horizontal plane which is perpendicular to the vertical axis. The preferred horizontal adjustment mechanism includes a bifurcated platform composed of an upper platform and a lower platform, wherein the lower platform is connected with the aforesaid alignment pins and rotary cam, and whereby it is immobile in relation to the horizontal plane. A threaded horizontal adjustment bolt is rotatably connected with the lower platform in fixed axial position with respect thereto and is threadably engaged with the threads of a horizontal adjustment nut. The horizontal adjustment nut is connected to a horizontal drive member which is axially movable in relation to the horizontal adjustment bolt in response to the horizontal adjustment nut threading with respect to the horizontal adjustment bolt. A horizontal drive slot is provided in the horizontal drive member which is oriented in the horizontal plane at an acute angle with respect to the axis of the horizontal drive bolt. A drive pin is connected to the upper platform, wherein the drive pin is received into the drive slot. Horizontal guide pins and horizontal guide slots guide movement of the upper platform in relation to the lower platform along the horizontal axis.

In operation, rotation of the horizontal adjustment bolt causes, via threading with the horizontal adjustment nut, the horizontal drive member to move with respect to the base and lower platform in a direction axially with respect to the horizontal drive bolt. As a consequence, the drive pin is caused to slide along the drive slot, wherein the acute angle of the drive slot causes the upper platform to move in the horizontal axis guided by the horizontal guide pins and horizontal guide slots.

Accordingly, it is an object of the present invention to provide a positioning apparatus for a motor mount platform, wherein two non-aligned V-belts may be simultaneously tightened.

It is an additional object of the present invention to provide a positioning apparatus, wherein a rotary cam mechanism provides a vertical position adjustment.

It is a further object of the present invention to provide a positioning apparatus, wherein a rotary cam mechanism provides for vertical position adjustment along a vertical axis, and further wherein a horizontal adjustment mechanism provides for movement in a horizontal plane, the horizontal plane being orthogonal to the vertical axis.

These, and additional objects, advantages, features and benefits of the present invention will become apparent from the following specification.

DETAILED DESCRIPTION OF THE PREFERRED EMBODIMENT

Figure 1:
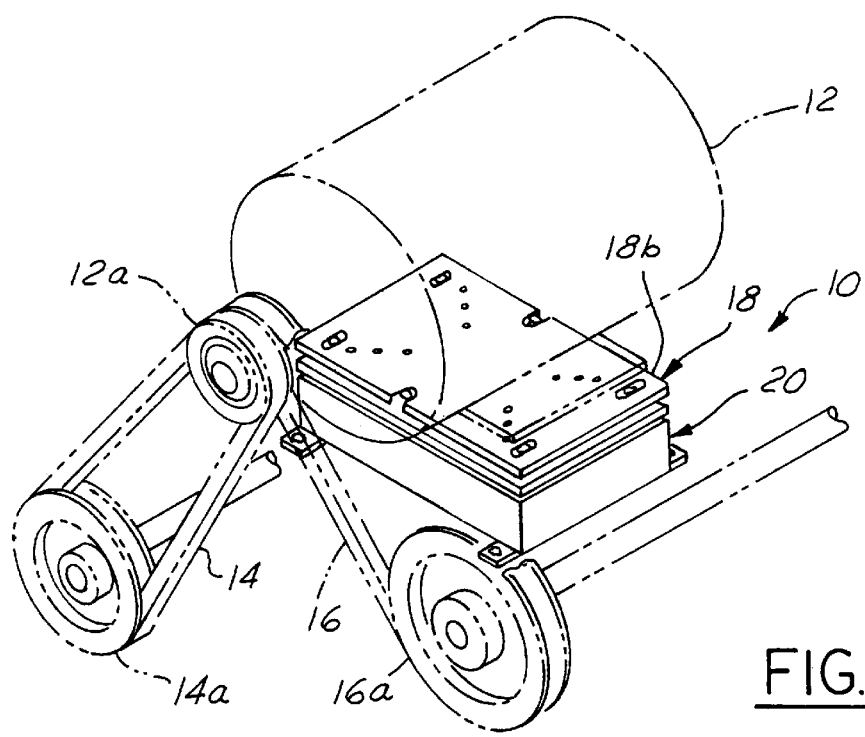
FIG. 1 is a perspective view of the positioning apparatus according to the present invention, shown in a typical environment of operation.

Referring now to the Drawing, FIG. 1 shows the positioning apparatus 10 according to the present invention being utilized in a typical environment of operation with respect to a motor 12 and two non-aligned V-belts 14, 16. The motor 12 is affixed to a platform 18 of the positioning apparatus 10. The platform 18 is connected to a base 20 of the positioning apparatus 10, wherein the platform is selectively movable with respect to the base. The base 20 is fixedly connected to a secondary structure, such as an immovable pedestal (not illustrated). Even though the two V-belts 14, 16 are non-aligned, the selective movement of the platform 18 with respect to the base 20 is such that the V-belts are simultaneously tightenable. In this regard, the motor must be movable vertically and horizontally in a drive plane defined by the aligned disposition of the drive wheel 12a and the driven wheels 14a, 16a (the motor need not, and should not, be moved perpendicular to the drive plane, as this would cause misalignment of the V-belts with respect to the drive and driven wheels). In order to understand the nature of the aforesaid selective movement of the platform 18 with respect to the base 20, reference will hereinbelow be made additionally to FIGS. 2 through 9.

Figure 2:
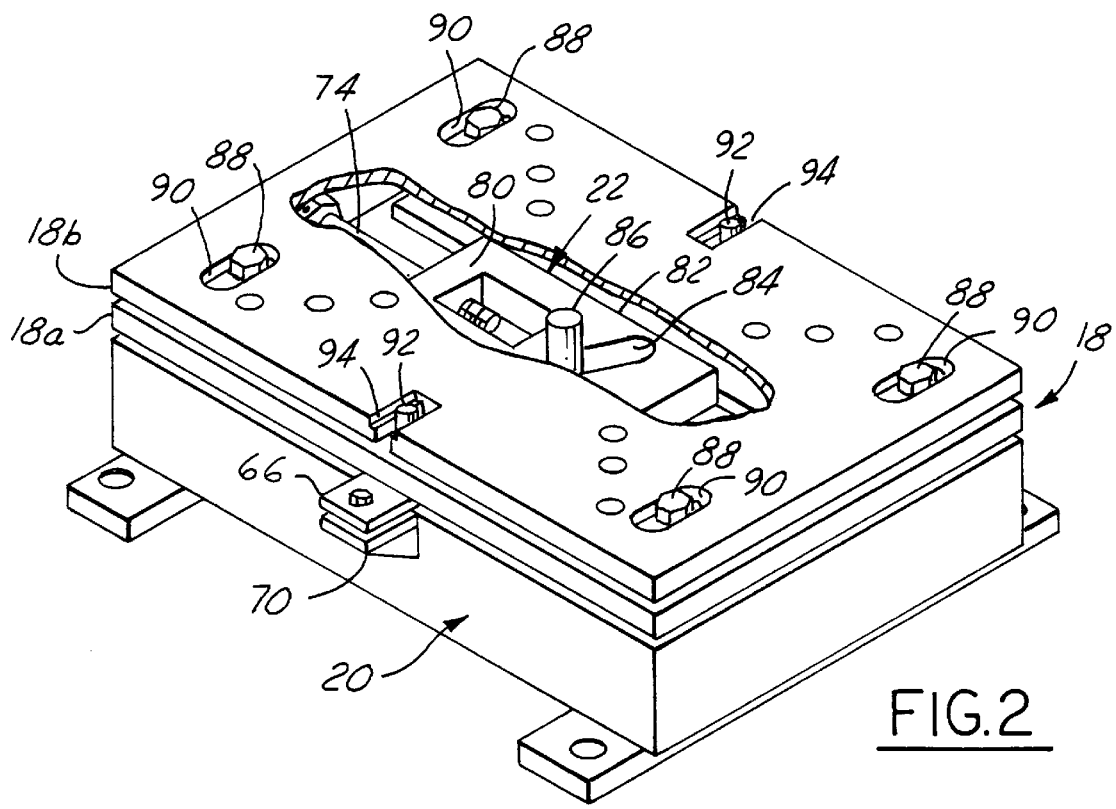
FIG. 2 is a partly broken-away, perspective view of the positioning apparatus according to the present invention.
Figure 3:
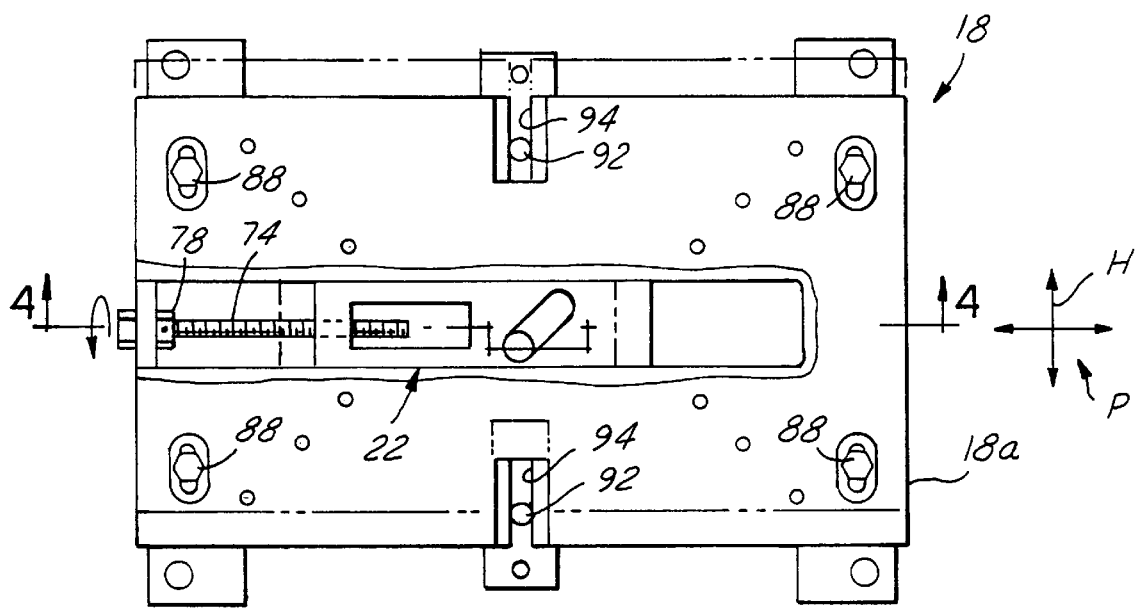
FIG. 3 is a partly broken-away, top plan view of the positioning apparatus according to the present invention, showing in particular the horizontal adjustment mechanism.
Figure 4:
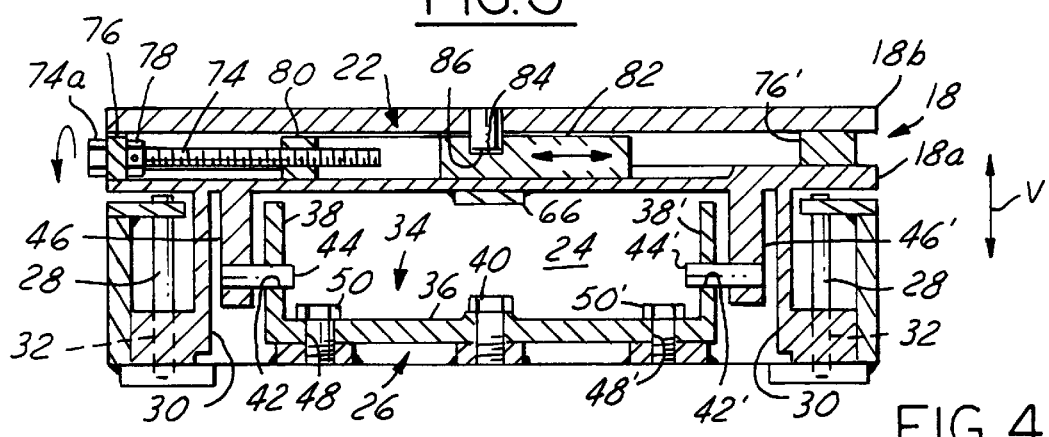
FIG. 4 is a partly sectional side view of the positioning apparatus according to the present invention, seen along line 4—4 in FIG. 3.
Figure 5:
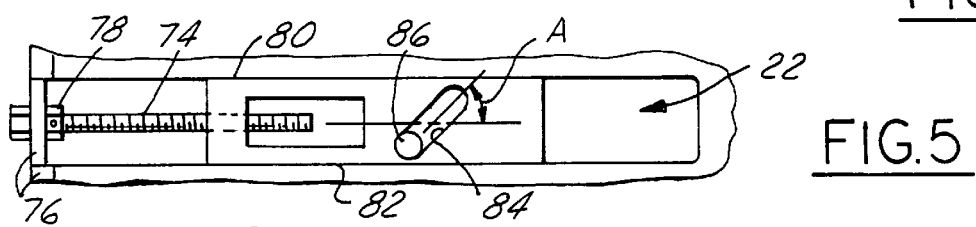
FIG. 5 is a detail, partly broken-away, top plan view of the positioning apparatus according to the present invention, showing the horizontal adjustment mechanism at one end of its travel.
Figure 6:
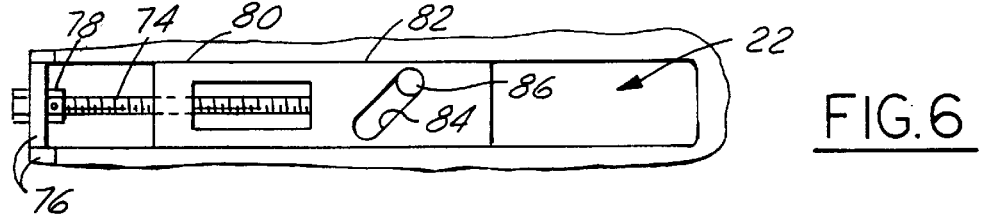
FIG. 6 is a detail, partly broken-away, top plan view of the positioning apparatus according to the present invention, showing the horizontal adjustment mechanism at the other end of its travel.

As shown at FIGS. 2, 3 and 4, the positioning apparatus 10, as mentioned, includes a platform 18 and a base 20. The preferred platform 18 is bifurcated into a lower platform 18a and an upper platform 18b. A horizontal adjustment mechanism 22 provides selective horizontal movement (ie., along a horizontal axis H in a horizontal plane P) of the upper platform 18b with respect to the lower platform 18a. The base 20 is provided with an interior hollow space 24 into which is resident a rotary cam mechanism 26 for providing vertical movement (ie., along a vertical axis V which is perpendicular to the horizontal plane H) of the platform 18 relative to the base.

As shown at FIG. 4, the platform 18 is vertically guided with respect to the base 20 via a plurality of vertical guide pins 28 respectively disposed adjacent the four corners of the base, wherein the vertical guide pins are affixed to the base at opposite ends thereof. The bottom platform 18a has a plurality of guide arms 30 respectively disposed at the four corners of the platform 18. Each guide arm 30 has a vertical guide hole 32 which receives therethrough a respective vertical guide pin 28. Consequently, the platform 18 is vertically movable with respect to the base, yet prevented from twisting or otherwise moving in the horizontal axis during the vertical movement by coaction of the vertical guide pins 28 and the vertical guide holes 32 of the guide arms 30.

Figure 7:
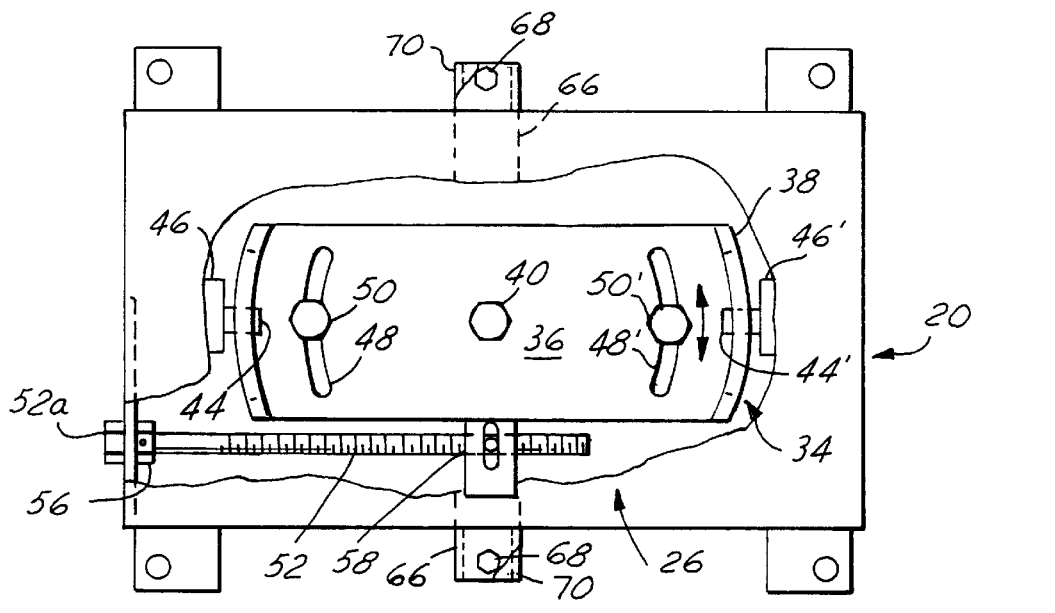
FIG. 7 is a partly broken-away, top plan view of the positioning apparatus according to the present invention, showing in particular the rotary cam mechanism.
Figure 8:
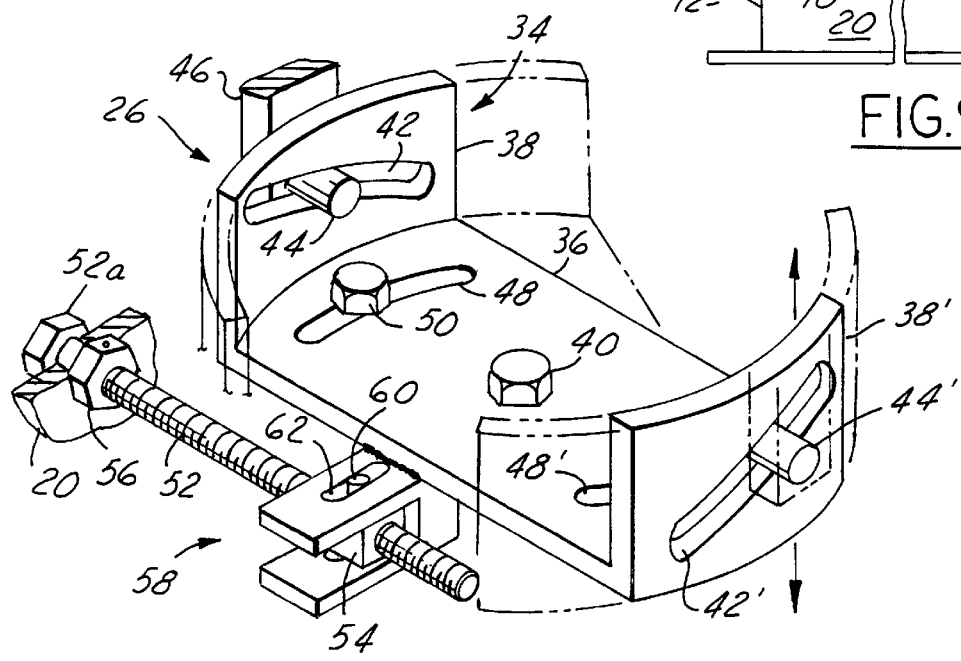
FIG. 8 is a perspective view of the the rotary cam mechanism.

Referring firstly to FIGS. 4, 7 and 8, the structure and function of the rotary cam mechanism 26 will be discussed.

The rotary cam mechanism 26 includes a rotary cam 34 having a bottom wall 36 and a pair of opposing, curved sidewalls 38, 38' connected in upstanding relation to the bottom wall The bottom wall 36 is pivotably connected to the base 20 at the geometrical center thereof via a pivot bolt 40. The curve of the sidewalls 38, 38' is that of a circle centered on the pivot bolt 40.

The sidewalls 38, 38' of the rotary cam 34 are respectively provided, such as by mining, with inclined cam slots 42, 42'. The cam slots 42, 42' are spiral with respect to the vertical axis V centered on the pivot bolt 40. A pair of opposing cam pins 44, 44' are connected with the lower platform 18a via opposing fingers 46, 46'. Each cam pin 44, 44' is individually received into a respective cam slot 42, 42'.

Adjacent the annular sidewalls 38, 38', the bottom wall 36 is provided with curved mounting slots 48, 48'. A hold down bolt 50, 50' is respectively received in each mounting slot 48, 48' and threadably engaged with the base 20. The hold down bolts 50 50' and mounting slots 48, 48' cooperate to allow the rotary cam 34 to pivot on the pivot bolt 40, while providing a strong mechanical connection of the rotary cam to the base 20.

To effect pivoting of the rotary cam 34, a vertical adjustment bolt 52 is provided which is oriented tangent to the rotation axis of the rotary cam and threadably interfaced with a vertical adjustment nut 54. In this regard, the vertical adjustment bolt 52 has a head 52a which is exposed with respect to the base 20, wherein the vertical adjustment bolt is rotatable in a hole formed in the base, yet axially affixed to the base via a retainer 56, such as a pinned nut. The vertical adjustment nut 54 is slidably engaged in a clevis 58 via a nut pin 60 connected with the vertical adjustment nut, wherein the nut pin is received in a slot 62 of the clevis. The clevis 58 is connected to the rotary cam 34.

In operation of the rotary cam mechanism 26, the user causes the vertical adjustment bolt 52 to be rotated, such as for example manually using a wrench or automatically via a motor drive. As the vertical adjustment bolt rotates, the vertical adjustment nut 54 moves along the threads of the vertical adjustment bolt. Since the vertical adjustment bolt is axially affixed relative to the base 20, the vertical adjustment nut is caused to move axially and, consequently, the rotary cam 34 rotates on the pivot bolt 40. Rotation of the rotary cam results in the cam slots 42, 42' slidably moving in relation to the cam pins 44, 44'. The spiral incline of the cam slots causes the cam pins to move along the vertical axis V. Since the cam pins are connected to the lower platform 18a, the platform 18 is caused to move vertically with respect to the base.

Figure 9:
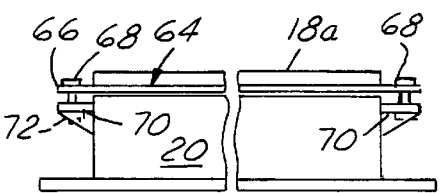
FIG. 9 is a partly broken-away end view of the positioning apparatus, particularly showing a tie down for selectively immobilizing the rotary cam mechanism thereof.

In order to affix the platform 18 at a selected position relative to the base 20, it is preferred to provide a tie down 64 therebetween. The tie down 64, as best shown at FIG. 9, includes a tie down bar 66 which is connected with the bottom platform 18a (see FIG. 4). Opposing ends of the tie down bar 66 are provided with holes through which a tie down bolt 68 respectively passes. The tie down bolts 68 pass respectively through an apertured flange 70 located on opposing sides of the base 20. Tie down nuts 72 threadably engage the tie down bolts 68. By tightening the tie down nuts 72 on the tie down bolts 68, the cam pins 44, 44' are held fast against the cam slots 42, 42', thereby immobilizing the rotary cam mechanism 26, whereby vertical movement of the platform 18 with respect to the base 20 is prevented without sole reliance on the vertical adjustment bolt 52.

Referring now to FIGS. 2 through 6, the structure and function of the horizontal adjustment mechanism 22 will be discussed.

A horizontal adjustment bolt 74 has a head 74a which is exposed relative to the platform 18. In this regard, the horizontal adjustment bolt 74 is rotatably located in a hole provided in a spacer block 76 (or an upturned flange) of the lower platform 18a. A retainer 78, such as a pinned nut, prevents the horizontal adjustment bolt 74 from axially moving relative to the platform 18.

A horizontal adjustment nut 80 is threadably engaged with the horizontal adjustment bolt 74. The horizontal adjustment nut 80 is carried by a horizontal drive member 82. The horizontal drive member 82 has a drive slot 84 formed therein, such as by milling. The drive slot 84 is oriented parallel with the horizontal plane H, and at an acute angle A, preferably of forty-five degrees, with respect to the axis of the horizontal adjustment bolt 74 (see FIG. 5). The upper platform 18b dependingly carries a drive pin 86. The drive pin 86 is received in the drive slot 84.

The upper platform 18b rests on opposing spacer blocks 76, 76' connected to the lower platform 18a. The upper and lower platforms 18b, 18a are interconnected via a plurality of platform connection bolts 88 respectively located at the corners of the platform 18, wherein the platform connection bolts threadably engage the spacer blocks 76, 76'. In this regard, the upper platform 18b is provided with slots 90 for allowing the upper platform to slide along the horizontal axis H relative to the platform connection bolts 88.

The movement of the upper platform 18b relative to the lower platform 18a is guided along the horizontal axis H via horizontal guide pins 92 of the lower platform being guidably received in horizontal guide slots 94 of the upper platform. In this regard, the horizontal guide slots 94 are elongated along the horizontal axis H.

In operation of the horizontal adjustment mechanism 22, the horizontal adjustment bolt 74 is rotated, such as manually or by motor. Rotation of the horizontal adjustment bolt results in the horizontal adjustment nut 80 threading long the horizontal adjustment bolt. Since the horizontal adjustment bolt is axially affixed relative to the lower platform 18a, the horizontal drive member 82 moves along a drive axis which is axial with respect to the horizontal drive bolt. As a consequence, the drive slot 84 is caused to slide relative to the drive pin 86, thereby causing the upper platform 18b to move along the horizontal axis H relative to the lower platform 18a, wherein the horizontal guide slots 94 guidably slide relative to the horizontal guide pins 92.

To affix the upper platform 18b relative to the lower platform 18a, the user tightens the platform connection bolts 88, thereby immobilizing the horizontal adjustment mechanism 22, whereby horizontal movement of the upper platform 18b with respect to the lower platform 18a is prevented without sole reliance on the horizontal adjustment bolt 74.

As mentioned hereinabove, an example of operation of the positioning apparatus 10 is shown at FIG. 1, wherein a plurality of non-aligned V-belts 14, 16 are being simultaneously tightened with respect to a motor 12 by the positioning apparatus 10. The motor is connected to the upper platform 18b and the base 20 is connected to an immovable secondary structure (not shown). With the tie down nuts 72 loose on the tie down bolts 68, the user rotates the vertical adjustment bolt 52 to vertically position the motor, and its drive wheel 12a, with respect to the driven wheels 14a, 16a of the respective V-belts. Next, the user adjusts the motor horizontally with respect to the driven wheels. With the platform connection bolts 88 loose, the horizontal adjustment bolt 74 is rotated until the V-belts are all tight. If thereafter the V-belts are not both fully tight, the vertical and horizontal adjustment procedures are repeated as necessary. The tie down bolts and the platform connection bolts are now tightened to affix the upper and lower platforms with respect to the base.

In this regard, the motor is moved vertically and horizontally in a drive plane defined by the aligned disposition of the drive wheel 12a and the driven wheels 14a, 16a (the motor need not, and should not, be moved perpendicular to the drive plane, as this would cause misalignment of the V-belts with respect to the drive and driven wheels). Accordingly, the preferred embodiment described herein provides for horizontal adjustment along the horizontal axis H. However, those having ordinary skill in the art are enabled, using the herein disclosure as a guide, to provide horizontal adjustment of the upper platform along any axis lying in the horizontal plane.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A positioning apparatus, comprising:
   a base;
   a platform movably connected with said base;
   means for guiding movement of said platform with respect to said base along a vertical axis; and
   rotary cam mechanism means comprising a rotary cam rotatably connected with one of said platform and said base for providing selective movement of said platform with respect to said base along said vertical axis responsive to rotation of a rotary cam with respect to said base;
   wherein said rotary cam mechanism means further comprises:
      said rotary cam having at least one inclined cam slot; and
      cam pin means connected to the other of said platform and said base and received in said at least one inclined cam slot for sliding along said at least one inclined cam slot when said rotary cam rotates in relation to said base to thereby cause said platform to move in relation to said base along said vertical axis.

2. The positioning apparatus of claim 1, further comprising horizontal adjustment means for selectively moving at least a portion of said platform relative to said base in a horizontal plane perpendicular to said vertical axis.

3. The positioning apparatus of claim 2, wherein said horizontal adjustment means comprises:
   a horizontal drive member having a drive slot formed therein;
   means for moving said horizontal drive member with respect to said base along a drive axis located in said horizontal plane, wherein said drive slot is oriented at a predetermined acute angle with respect to said drive axis;
   a drive pin connected with said portion of said platform, said drive pin being received in said drive slot; and
   means for guiding movement of said portion of said platform in said horizontal plane in response to movement of said horizontal drive member with respect to said base and said portion of said platform.

4. The positioning apparatus of claim 1, wherein said rotary cam comprises:
   a bottom wall;
   a first curved sidewall connected to said bottom wall in upstanding relation with respect thereto, said first curved sidewall having a first inclined cam slot formed therein;
   a second curved sidewall connected to said bottom wall in upstanding relation with respect thereto, said second curved sidewall being located opposite said first curved sidewall, said second curved sidewall having a second inclined cam slot formed therein; and
   means for pivotally connecting said bottom wall to said base,
   wherein said rotary cam is pivotal about a rotation axis parallel with respect to said vertical axis.

5. The positioning apparatus of claim 4, wherein said rotary cam mechanism means further comprises:
   a first cam pin connected with said platform, said first cam pin being received in said first cam slot;
   a second cam pin connected with said platform, said second cam pin being received in said second cam slot; and
   means for pivoting said rotary cam about said rotation axis.

6. The positioning apparatus of claim 5, wherein said means for rotating said rotary cam comprises:
   a vertical adjustment bolt rotatably mounted to said base;
   a vertical adjustment nut threadably engaged with said vertical adjustment bolt; and
   means for connecting said vertical adjustment nut to said rotary cam, wherein said vertical adjustment nut is pivotal about a nut pivoting axis oriented parallel to said vertical axis, and wherein said vertical adjustment nut is radially slidable in relation to said rotation axis.

7. The positioning apparatus of claim 6, further comprising horizontal adjustment means for selectively moving at least a portion of said platform relative to said base in a horizontal plane perpendicular to said vertical axis.

8. The positioning apparatus of claim 7, wherein said horizontal adjustment means comprises:
   a horizontal drive member having a drive slot formed therein;
   means for moving said horizontal drive member with respect to said base along a first axis located in said horizontal plane, wherein said drive slot is oriented at a predetermined acute angle with respect to said first axis;
   a drive pin connected with said portion of said platform, said drive pin being received in said drive slot; and
   means for guiding movement of said portion of said platform in said horizontal plane in response to movement of said horizontal drive member with respect to said base and said portion of said platform.

9. The positioning apparatus of claim 8, further comprising:
   means for selectively immobilizing said rotary cam mechanism means; and
   means for selectively immobilizing said horizontal adjustment means.

10. A positioning apparatus, comprising:
    a base;
    a bifurcated platform comprising:
       a lower platform movably connected with said base;
       an upper platform movably connected to said lower platform;
    means for guiding movement of said lower platform with respect to said base along a vertical axis;
    rotary cam mechanism means comprising a rotary cam rotatably connected with said base for providing selective movement of said lower platform with respect to said base along said vertical axis responsive to rotation of a rotary cam with respect to said base; and
    horizontal adjustment means for selectively moving said upper platform relative to said lower platform along a horizontal axis perpendicular to said vertical axis.

11. The positioning apparatus of claim 10, wherein said rotary cam mechanism means further comprises:
    said rotary cam having at least one inclined cam slot; and
    cam pin means connected to said lower platform and received in said at least one inclined cam slot for sliding along said at least one inclined cam slot when said rotary cam rotates in relation to said base to thereby cause said lower platform to move in relation to said base along said vertical axis.

12. The positioning apparatus of claim 11, wherein said horizontal adjustment means comprises:
    a horizontal drive member having a drive slot formed therein;
    means for moving said horizontal drive member with respect to said lower platform along a drive axis, wherein said drive slot is oriented at a predetermined acute angle with respect to said drive axis;
    a drive pin connected with said upper platform, said drive pin being received in said drive slot; and
    means for guiding movement of said upper platform along said horizontal axis in response to movement of said horizontal drive member with respect to said lower and upper platforms.

13. The positioning apparatus of claim 10, wherein said rotary cam comprises:
    a bottom wall;
    a first curved sidewall connected to said bottom wall in upstanding relation with respect thereto, said first curved sidewall having a first inclined cam slot formed therein;
    a second curved sidewall connected to said bottom wall in upstanding relation with respect thereto, said second curved sidewall being located opposite said first curved sidewall, said second curved sidewall having a second inclined cam slot formed therein; and means for pivotally connecting said bottom wall to said base, wherein said rotary cam is pivotal about a rotation axis parallel with respect to said vertical axis.

14. The positioning apparatus of claim 13, wherein said rotary cam mechanism means further comprises:

a first cam pin connected with said lower platform, said first cam pin being received in said first cam slot;

a second cam pin connected with said lower platform, said second cam pin being received in said second cam slot; and means for pivoting said rotary cam about said rotation axis.

15. The positioning apparatus of claim 14, wherein said means for rotating said rotary cam comprises:

a vertical adjustment bolt rotatably mounted to said base;

a vertical adjustment nut threadably engaged with said vertical adjustment bolt; and means for connecting said vertical adjustment nut to said rotary cam, wherein said vertical adjustment nut is pivotal about a nut pivoting axis oriented parallel to said vertical axis, and wherein said vertical adjustment nut is radially slidable in relation to said rotation axis.

16. The positioning apparatus of claim 15, wherein said horizontal adjustment means comprises:

a horizontal drive member having a drive slot formed therein;

means for moving said horizontal drive member with respect to said lower platform along a drive axis located in said horizontal plane, wherein said drive slot is oriented at a predetermined acute angle with respect to said drive axis;

a drive pin connected with said upper platform, said drive pin being received in said drive slot; and means for guiding movement of said upper platform along said horizontal axis in response to movement of said horizontal drive member with respect to said lower and upper platforms.

17. The positioning apparatus of claim 16, further comprising:

means for selectively immobilizing said rotary cam mechanism means; and means for selectively immobilizing said horizontal adjustment means.

* * * * *